United States Patent
Li et al.

(10) Patent No.: US 10,725,790 B2
(45) Date of Patent: Jul. 28, 2020

(54) METHOD FOR IDENTIFYING A BOOT STAGE OF BIOS FROM A SCREEN IMAGE

(71) Applicant: MITAC COMPUTING TECHNOLOGY CORPORATION, Taoyuan (TW)

(72) Inventors: Jyun-Hong Li, Taoyuan (TW); Chi-Hao Kuan, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/588,174

(22) Filed: Sep. 30, 2019

(65) Prior Publication Data

US 2020/0159541 A1 May 21, 2020

(30) Foreign Application Priority Data

Nov. 20, 2018 (TW) .............................. 107141226 A

(51) Int. Cl.
*G06F 9/4401* (2018.01)
*G06K 9/62* (2006.01)
*G06N 20/00* (2019.01)
*G06K 9/46* (2006.01)

(52) U.S. Cl.
CPC .......... *G06F 9/4405* (2013.01); *G06K 9/4604* (2013.01); *G06K 9/628* (2013.01); *G06K 9/6269* (2013.01); *G06N 20/00* (2019.01)

(58) Field of Classification Search
CPC .... G06N 20/00; G06K 9/4604; G06K 9/6269; G06K 9/628
See application file for complete search history.

(56) References Cited

U.S. PATENT DOCUMENTS

| | | | | |
|---|---|---|---|---|
| 8,850,173 | B2* | 9/2014 | Landry | ................... G06F 8/65 711/102 |
| 10,078,803 | B2* | 9/2018 | Sharifi | ................. H04L 63/083 |
| 10,489,126 | B2* | 11/2019 | Kumar | ................. G06K 9/6269 |

* cited by examiner

*Primary Examiner* — Edward Park
(74) *Attorney, Agent, or Firm* — Brinks Gilson & Lione

(57) ABSTRACT

A method for identifying a boot stage of a BIOS of a computer device is provided. A control terminal receives screen information data indicative of a current BIOS screen image of the computer device, acquires current screen information based on the screen information data, acquires feature vector based on the current screen information, uses an image classification model to classify the current information into a screen category, and generates boot stage information indicative of a boot stage corresponding to the screen category.

10 Claims, 7 Drawing Sheets

```
/------------------------------------------\
|       Please select boot device:         |
|------------------------------------------|
| SanDisk SanDisk Ultra PMAP               |
| Enter Setup                              |
|------------------------------------------|
|      ^ and v to move selection           |
|      ENTER to select boot device         |
|       ESC to boot using defaults         |
\------------------------------------------/
```

FIG. 7

METHOD FOR IDENTIFYING A BOOT STAGE OF BIOS FROM A SCREEN IMAGE

CROSS-REFERENCE TO RELATED APPLICATION

This application claims priority of Taiwanese Invention Patent Application No. 107141226, filed on Nov. 20, 2018.

FIELD

The disclosure relates to information identification, and more particularly to a screen identification method to identify a boot stage for each screen during execution of a basic input/output system (BIOS).

BACKGROUND

When a testing personnel intends to configure setting of a BIOS executed by a computer when the computer is powered on, the testing personnel has to know what the current boot stage is in order to perform the corresponding setup procedure. Conventionally, the testing personnel needs to pay attention to the information that is shown in the images displayed on a screen of the computer in order to know the current boot stage from the information. Such operation is not effective in terms of time and the use of manpower.

SUMMARY

Therefore, an object of the disclosure is to provide a method capable of automatically identifying a boot stage for a current BIOS screen image during execution of a BIOS of a computer device.

According to the disclosure, the method is proposed for identifying a boot stage of a BIOS of a computer device that, during execution of the BIOS, generates a plurality of BIOS screen images each corresponding to one of multiple boot stages of the BIOS. The method includes: by a control terminal that is communicatively coupled to the computer device, receiving screen information data indicative of a current BIOS screen image that corresponds to current operation of the BIOS of the computer device; by the control terminal, acquiring current screen information corresponding to the current BIOS screen image based on the screen information data; by the control terminal, acquiring a plurality of feature vectors based on the current screen information; and by the control terminal, using an image classification model that is used for classification of the BIOS screen images to classify, based on the feature vectors, the current screen information into one of a plurality of screen categories each corresponding to one of the boot stages, and generating boot stage information indicative of one of the boot stages that corresponds to said one of the screen categories.

BRIEF DESCRIPTION OF THE DRAWINGS

Other features and advantages of the disclosure will become apparent in the following detailed description of the embodiment (s) with reference to the accompanying drawings, of which:

FIG. 7 is a schematic diagram exemplarily showing a simulation screen image corresponding to the current BIOS screen image shown in FIG. 6.

DETAILED DESCRIPTION

Figure 1:
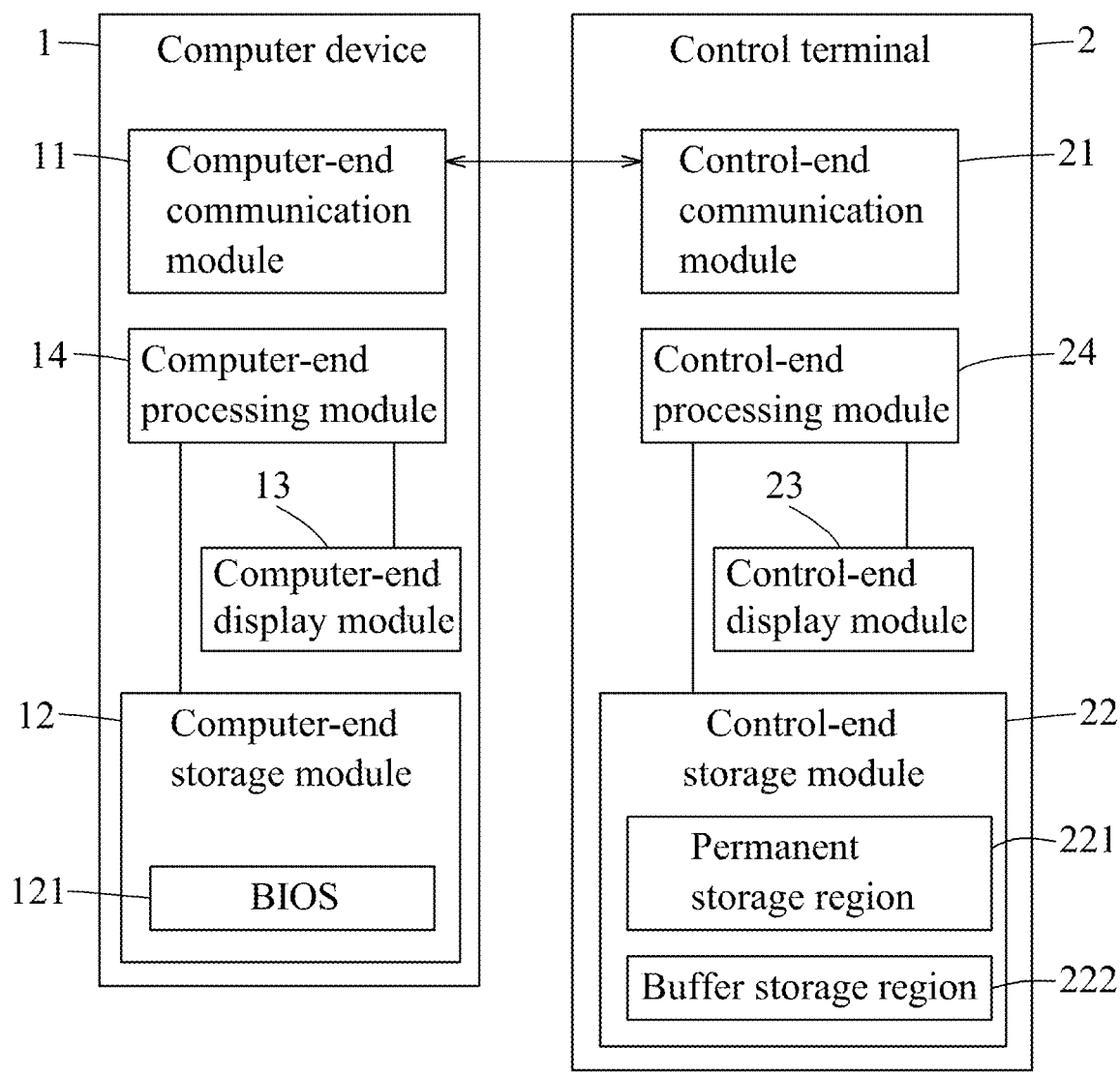
FIG. 1 is a block diagram illustrating a system to implement an embodiment of the method for identifying a boot stage of a BIOS of a computer according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the method for identifying a boot stage of a BIOS 121 of a computer device 1 according to this disclosure is implemented by a system including the computer device 1, and a control terminal 2 communicatively coupled to the computer device 1.

The computer device 1 may be, for example but not limited to, a personal computer, a notebook computer, a server, or a cloud server, and includes a computer-end communication module 11, a computer-end storage module 12, and a computer-end processing module 14 coupled to the computer-end communication module 11 and the computer-end storage module 12. The computer-end communication module 11 may include a network card, an RS-232 controller, a baseboard management controller (BMC), a complex programmable logic device (CPLD), a debug tool board, or a combination thereof. The computer-end processing module 14 may include one or more processors, and may be selectively coupled to a computer-end display module 13 (e.g., an LCD display) via a computer-end platform controller hub (PCH) or a computer-end signal output port (e.g., an HDMI port, a display port, a DVI port, a D-sub port, etc.).

The computer-end storage module 12 may include a non-volatile storage device (e.g., a hard disk drive, a flash memory module, an EEPROM, etc.) that stores the BIOS 121. The computer-end processing module 14 is configured to load the BIOS 121 into a volatile memory module (not shown) and to execute the loaded BIOS 121. During execution of the BIOS 121 and in response to operation of the BIOS 121, the computer-end processing module 14 generates a plurality of BIOS screen images for display by the computer-end display module 13. Each of the BIOS screen images corresponds to one of multiple boot stages, and indicates an operation status or a setup interface of the BIOS 121. During the boot process of the computer device 1, a local user may press specific keys on a keyboard connected to the computer device 1, or a remote user may send an instruction via a network, in order to interrupt the boot process and to enter the setup interface that causes the computer device 1 to output an image of a BIOS setup menu. A main page of the BIOS setup menu may include several functional options for the user to adjust BIOS settings, and several options for entering subpages that are relevant to the BIOS setup menu. If the option corresponding to a subpage is selected by the user, the computer device 1 outputs images of the subpage.

The control terminal 2 may be, for example but not limited to, a personal computer, a notebook computer, a server or a cloud server, and includes a control-end communication module 21, a control-end storage module 22, and a control-end processing module 24 coupled to the control-end communication module 21 and the control-end storage module 22. The control-end processing module 24 may include one or more processors, and may be selectively coupled to a control-end display module 23 (e.g., an LCD display) via a control-end PCH or a control-end signal output port (e.g., an HDMI port, a display port, a DVI port, a D-sub port, etc.). The control terminal 2 may remotely communicate with and control operation of the computer device 1.

In this embodiment, the control-end storage module 22 includes a permanent storage region 221 and a buffer storage region 222. In this embodiment, the permanent storage region 221 is realized using a non-volatile storage device (e.g., a hard disk drive, a flash memory module, an EEPROM, etc.), and the buffer storage region 222 is realized using a volatile storage device, such as a RAM module, but this disclosure is not limited in this respect.

The permanent storage region 221 stores a plurality of setting information pieces respectively related to different BIOS versions of the BIOS. Each of the setting information pieces includes a plurality of training screen information pieces that correspond to multiple different BIOS screen images of the corresponding one of the difference BIOS versions, and further includes, for each of the training screen information pieces thereof, one of multiple screen categories to which the training screen information piece corresponds. Each of the screen categories corresponds to one of the boot stages. The correspondences between the screen categories and the boot stages may be stored in the permanent storage region 221, and thus are known to the control-end processing module 24.

In this embodiment, the screen categories exemplarily include a category of power-on self-test (POST), a category of BIOS boot specification (BBS) menu, a category of setup menu, a category of command line, and a category of preboot execution environment (PXE).

The buffer storage region 222 is used to store screen information data transmitted by the computer device 1. The screen information data is indicative of a current BIOS screen image that corresponds to current operation of the BIOS 121 of the computer device 1, and includes a plurality of character strings, and a plurality of control codes corresponding to the character strings. The control codes may include positional control codes indicative of positions of the character strings in the current BIOS screen image, and graphic control codes indicative of colors in relation to the character strings in the current BIOS screen image. For example, "ESC[5;1HESC[1;37;47m Memory Voltage" is a piece of screen information data that includes a character string "Memory Voltage", a positional control code "ESC[5;1H" that represents a position of row 5 and column 1 in the current BIOS screen image, and a graphic control code "ESC[1;37;47m" that represents increased intensity, a foreground color of white, and a background color of gray.

In this embodiment, the method for identifying a boot stage of the BIOS 121 includes a classification model training procedure, and a boot stage identification procedure.

Figure 2:
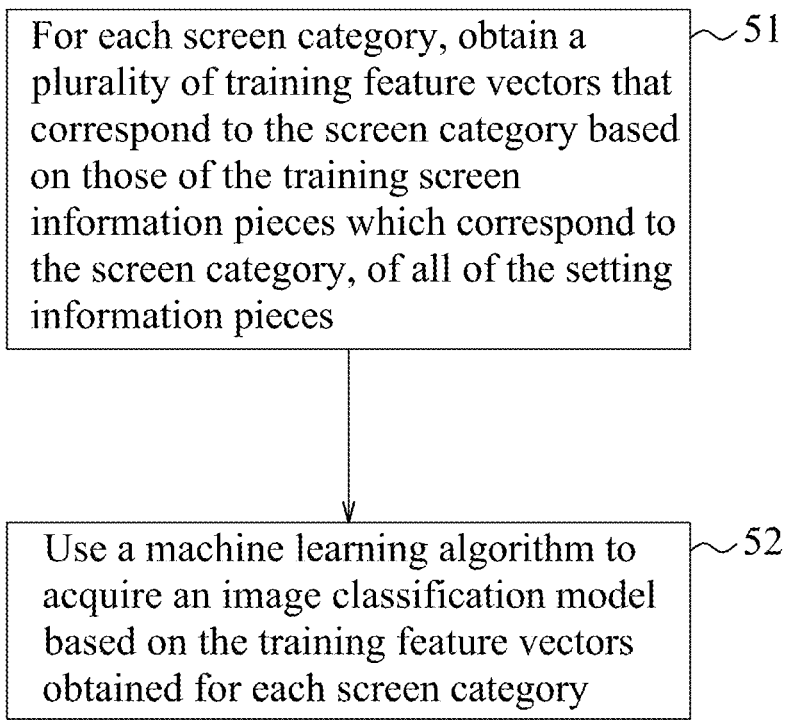
FIG. 2 is a flow chart illustrating steps of a classification model training procedure of the embodiment.

FIG. 2 exemplarily illustrates steps of the classification model training procedure.

In step 51, for each of the screen categories, the control-end processing module 24 uses sklearn.svm.LinearSVC to obtain a plurality of training feature vectors that correspond to the respective (particular) screen category based on those of the training screen information pieces which correspond to the respective screen category, of all of the setting information pieces. Since sklearn.svm.LinearSVC is a conventional technique and is not a key point of this disclosure, details thereof are omitted herein for the sake of brevity.

In step 52, the control-end processing module 24 uses a machine learning algorithm to acquire an image classification model based on the training feature vectors obtained for each of the screen categories. In this embodiment, the machine learning algorithm is a support vector machine, but this disclosure is not limited in this respect.

Figure 3:
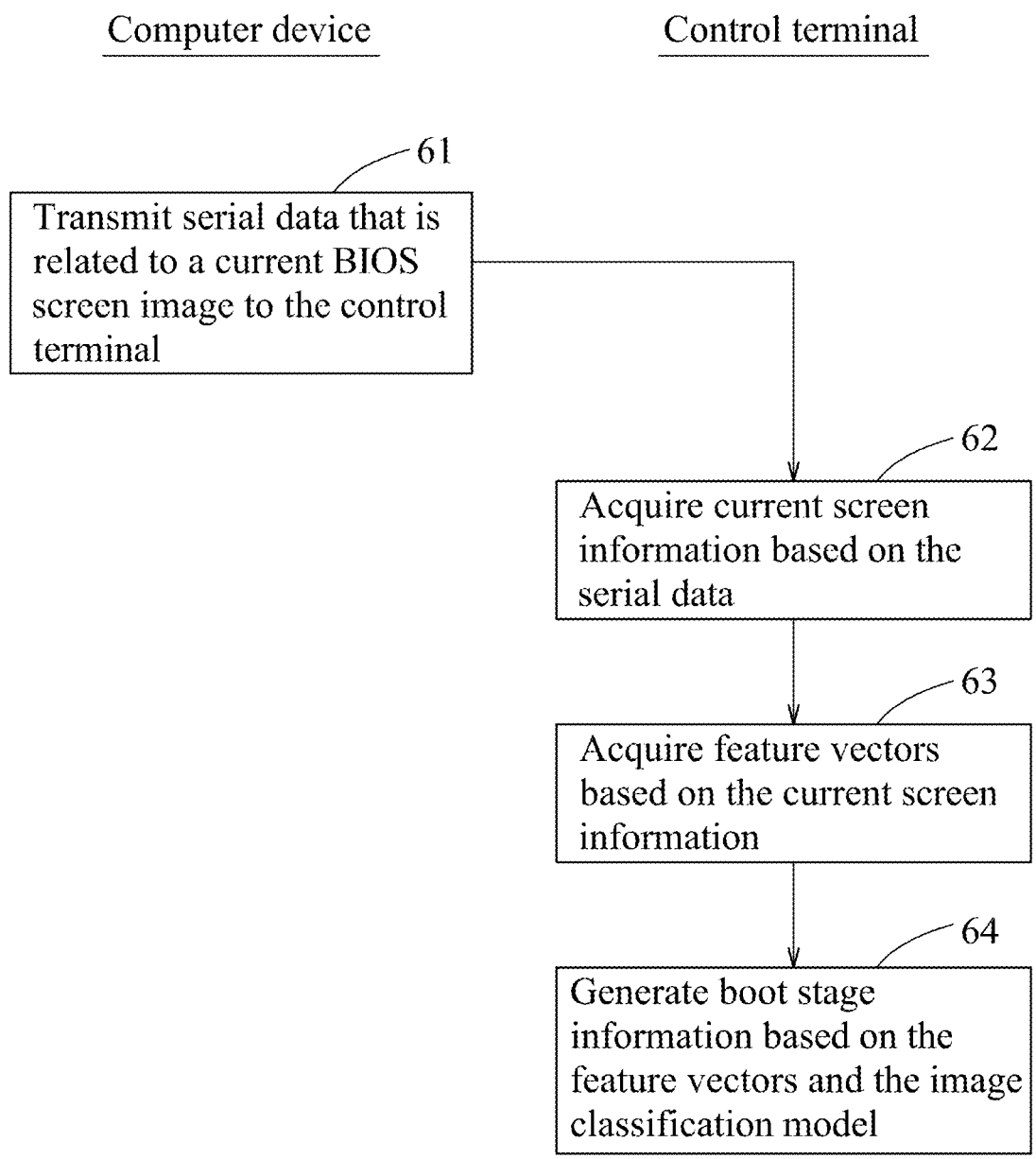
FIG. 3 is a flow chart illustrating steps of a boot stage identification procedure of the embodiment.

FIG. 3 exemplarily illustrates steps of the boot stage identification procedure.

In step 61, the computer-end processing module 14 transmits the screen information data indicative of the current BIOS screen image to the control terminal 2 when executing the BIOS 121. The current BIOS screen image corresponds to a current operation or a current setup interface of the BIOS 121.

In step 62, the control-end processing module 24 receives the screen information data from the computer-end processing module 14, and acquires current screen information corresponding to the current BIOS screen image based on the screen information data.

Figure 4:
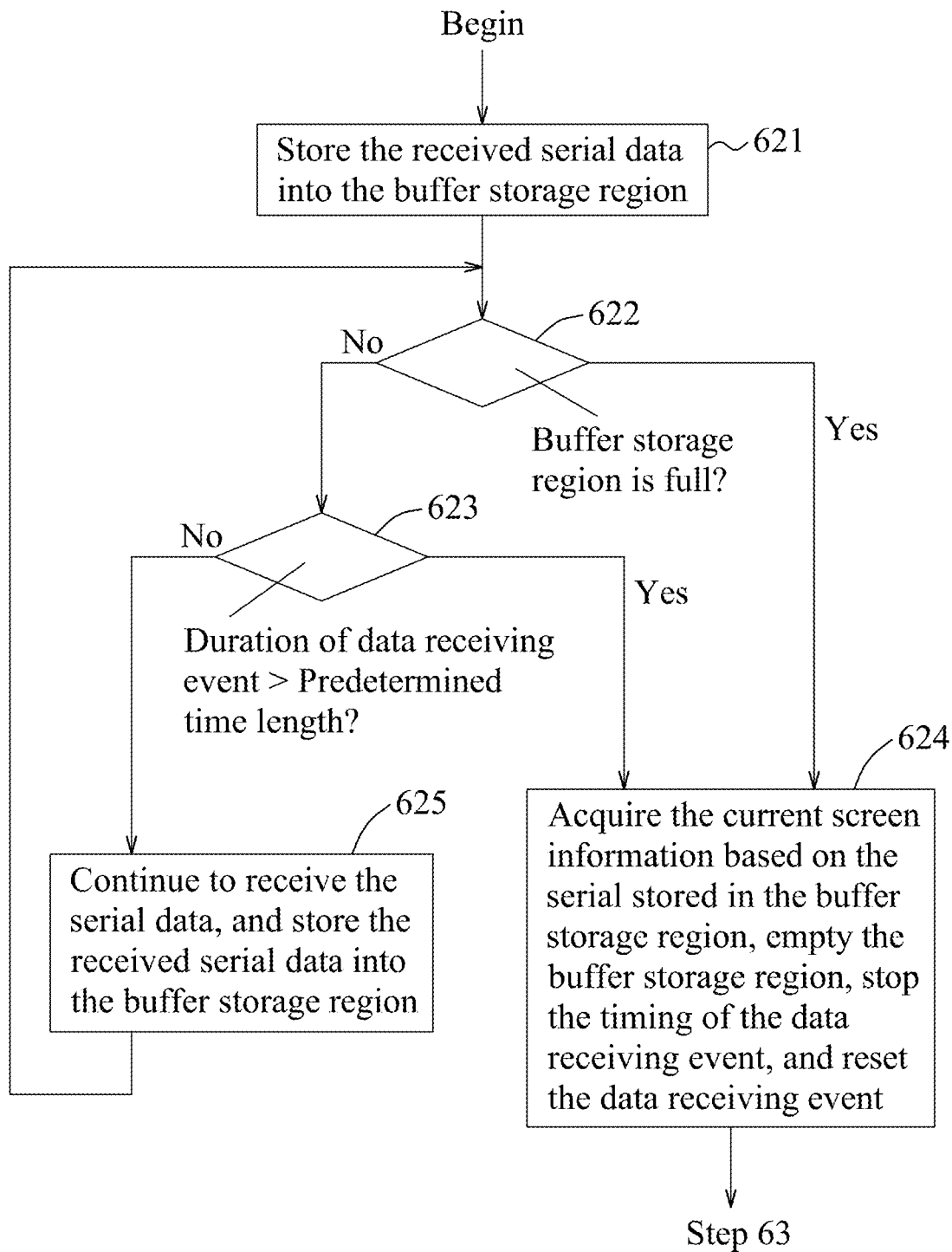
FIG. 4 is a flow chart illustrating step 62 in more detail.

Referring to FIG. 4, step 62 exemplarily includes sub-steps 621 to 625 in this embodiment.

In sub-step 621, upon receipt of the screen information data, the control-end processing module 24 stores the screen information data into the buffer storage region 222, and starts to time a data receiving event when the data receiving event is recorded as being in an initial state (e.g., when the control-end processing module 24 has not started timing yet). In some embodiments, the control-end processing module 24 may not have the timing function, and the action of timing would be omitted.

In sub-step 622, the control-end processing module 24 determines whether the buffer storage region 222 is full (i.e., the remaining available space is smaller than a predetermined amount). The flow goes to sub-step 623 when the control-end processing module 24 determines that the buffer storage region 222 is not full, and goes to sub-step 624 when otherwise. In some embodiments, sub-step 622 may be omitted, and the flow may directly go from sub-step 621 to sub-step 623.

In sub-step 623, the control-end processing module 24 determines whether a duration of the data receiving event thus timed has reached a predetermined time length. In other words, the control-end processing module 24 determines whether the time elapsed thus far after timing has begun (also referred to as "data receiving period") has reached the predetermined time length. The flow goes to sub-step 624 when the control-end processing module 24 determines that the duration of the data receiving event has reached the predetermined time length, and goes to sub-step 625 when otherwise. In some embodiments, the control-end processing module 24 may not have the timing function, and sub-step 623 would be omitted.

In sub-step 624, the control-end processing module 24 acquires the current screen information based on the screen information data stored in the buffer storage region 222, followed by emptying the buffer storage region 222, stopping the timing of the data receiving event, and resetting the data receiving event to the initial state (e.g., resetting the data receiving period to zero or an initial value). Then, the flow goes to step 63.

Figure 5:
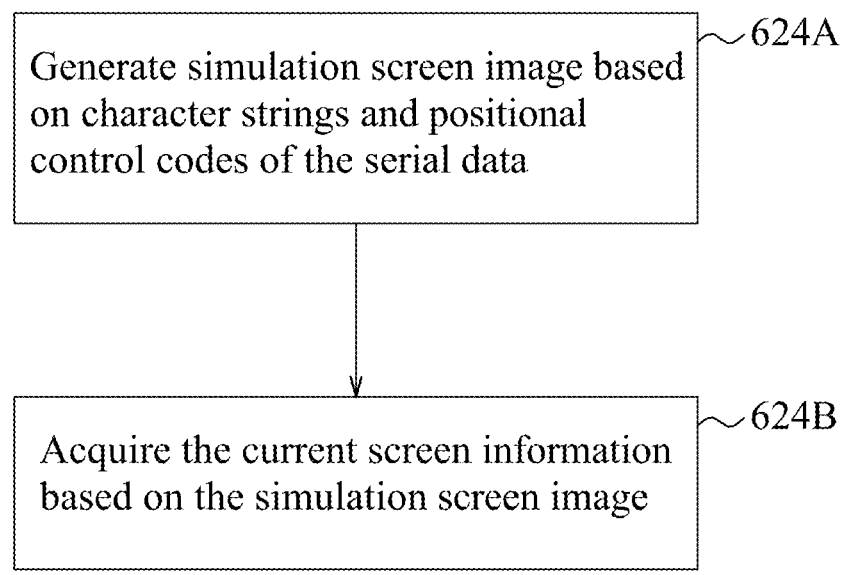
FIG. 5 is a flow chart illustrating sub-step 624 in more detail.

Referring to FIG. 5, the acquiring the current screen information in sub-step 624 includes sub-steps 624A and 624B in this embodiment.

Figure 6:
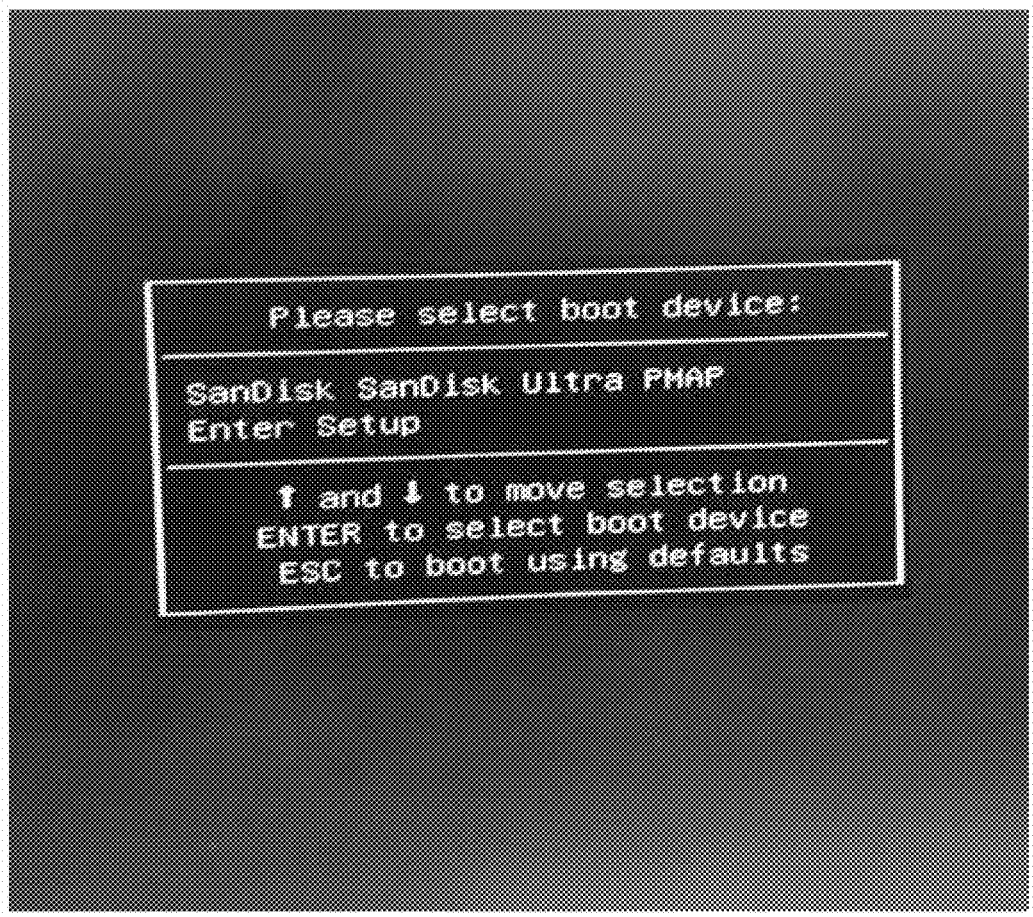
FIG. 6 is a schematic diagram exemplarily showing a current BIOS screen image.

In sub-step 624A, the control-end processing module 24 generates a simulation screen image that corresponds to the current BIOS screen image based on the character strings and the positional control codes of the screen information data stored in the buffer storage region 222. For each of the character strings, the control-end processing module 24 locates the character string in the simulation screen image at a position corresponding to that indicated by the corresponding one of the positional control codes, so the position of the character string in the simulation screen image corresponds to that in the current BIOS screen image. FIGS. 6 and 7 exemplarily show a current BIOS screen image and a corresponding simulation screen image, respectively. The control-end processing module 24 may cause the control-end display module 23 to display the simulation screen image to notify a testing personnel of the current BIOS operation, but this disclosure is not limited in this respect because displaying the simulation screen image on the control-end display module 23 is not necessary for the control terminal 2 to identify the boot stage of the BIOS 121 of the computer device 1.

In sub-step 624B, the control-end processing module 24 acquires the current screen information based on the simulation screen image. In this embodiment, the current screen information is a text file or an image file. In other words, the control-end processing module 24 converts, in sub-step 624B, the simulation screen image into a text file or an image file that serves as the current screen information, but this disclosure is not limited in this respect.

Referring back to FIG. 4, in sub-step 625, the control-end processing module 24 continues to receive the screen information data from the computer device 1, and stores the screen information data into the buffer storage region 222 upon receipt of the screen information data. The flow goes back to the end of sub-step 621 after sub-step 625.

It is noted that the timing of the data receiving event, which begins in sub-step 621, continues throughout sub-steps 622, 623 and 625, and eventually stops in step 624.

Referring to FIG. 3 again, in step 63, the control-end processing module 24 uses sklearn.svm.LinearSVC to obtain a plurality of feature vectors based on the current screen information.

In step 64, the control-end processing module 24 uses the image classification model that is obtained in step 52 to classify the current screen information into one of the screen categories based on the feature vectors, and generates boot stage information indicative of one of the boot stages that corresponds to said one of the screen categories.

In practice, the testing personnel may set, in advance, a target boot stage in which a setup procedure is to be performed, and uses the control terminal 2 to execute, during execution of the BIOS 121 of the computer device 1, the boot stage identification procedure to identify the boot stage to which the current BIOS screen image of the computer device 1 corresponds. When the control terminal 2 determines that the current BIOS screen image corresponds to the target boot stage, the control terminal 2 may automatically transmit desired setup instructions related to the target boot stage to the computer device 1, so the computer device 1 can perform relevant setup operation in response to the setup instructions received thereby. For example, the testing personnel may install a testing program that includes multiple sets of setup instructions for different boot stages in the control terminal 2. The control terminal 2 that executes the testing program may automatically send, in response to the boot stages identified using the boot stage identification procedure, corresponding sets of setup instructions to the computer device 1 to perform the desired setup.

In summary, the method for identifying a boot stage of the BIOS 121 of the computer device 1 according to this disclosure generates the simulation screen image based on the character strings and the control codes of the screen information data that is related to the current BIOS screen image of the computer device 1, acquires the current screen information based on the simulation screen image, and acquires feature vectors based on the current screen information. Then, the image classification model that is trained in advance is used to classify the current screen information into one of the screen categories based on the feature vectors, so as to generate the boot stage information indicative of the current boot stage of the BIOS 121. By virtue of the automatic identification of the boot stage of the BIOS 121, the testing personnel may perform the desired setup procedures for the BIOS 121 more efficiently, thereby saving time and manpower.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for identifying a boot stage of a basic input/output system (BIOS) of a computer device that, during execution of the BIOS, generates a plurality of BIOS screen images each corresponding to one of multiple boot stages of the BIOS, said method comprising:

by a control terminal that is communicatively coupled to the computer device, receiving screen information data indicative of a current BIOS screen image that corresponds to current operation of the BIOS of the computer device;

by the control terminal, acquiring current screen information corresponding to the current BIOS screen image based on the screen information data;

by the control terminal, acquiring a plurality of feature vectors based on the current screen information; and by the control terminal, using an image classification model that is used for classification of the BIOS screen images to classify, based on the feature vectors, the current screen information into one of a plurality of screen categories each corresponding to one of the boot stages, and generating boot stage information indicative of one of the boot stages that corresponds to said one of the screen categories.

2. The method of claim 1, the control terminal storing a plurality of setting information pieces related to different BIOS versions of the BIOS, wherein each of the setting information pieces includes a plurality of training screen information pieces that correspond to multiple different BIOS screen images of the corresponding one of the different BIOS versions, and includes, for each of the training screen information pieces thereof, one of the screen categories to which the training screen information piece corresponds;

said method further comprising, prior to the acquiring current screen information:
  by the control terminal, for each of the screen categories, obtaining a plurality of training feature vectors that correspond to the screen category based on those of the training screen information pieces which correspond to the screen category, of all of the setting information pieces; and
  by the control terminal, acquiring the image classification model based on a machine learning algorithm and the training feature vectors obtained for the screen categories.

3. The method of claim 1, the control terminal including a buffer storage region for storing the screen information data, wherein the acquiring current screen information includes:
  upon receipt of the screen information data, storing the screen information data into the buffer storage region, and, starting to time a data receiving event when the data receiving event is in an initial state;
  determining whether the buffer storage region is full;
  upon determining that the buffer storage region is full, acquiring the current screen information based on the screen information data stored in the buffer storage region, emptying the buffer storage region, stopping the timing of the data receiving event, and resetting the data receiving event to the initial state;
  upon determining that the buffer storage region is not full, determining whether duration of the data receiving event thus timed has exceeded a predetermined time length; and
  upon determining that the duration of the data receiving event thus timed has exceeded the predetermined time length, acquiring the current screen information based on the screen information data stored in the buffer storage region, emptying the buffer storage region, stopping the timing of the data receiving event, and resetting the data receiving event to the initial state.

4. The method of claim 1, the control terminal including a buffer storage region for storing the screen information data, wherein the acquiring current screen information includes:
  upon receipt of the screen information data, storing the screen information data into the buffer storage region, followed by determining whether the buffer storage region is full; and
  upon determining that the buffer storage region is full, acquiring the current screen information based on the screen information data stored in the buffer storage region, and emptying the buffer storage region.

5. The method of claim 1, the control terminal including a buffer storage region for storing the screen information data, wherein the acquiring current screen information includes:
  upon receipt of the screen information data, storing the screen information data into the buffer storage region, and, starting to time a data receiving event when the data receiving event is in an initial state;
  determining whether a duration of the data receiving event thus timed has exceeded a predetermined time length; and
  upon determining that the duration of the data receiving event has exceeded the predetermined time length, acquiring the current screen information based on the screen information data stored in the buffer storage region, emptying the buffer storage region, and resetting the data receiving event to the initial state.

6. The method of claim 1, wherein the screen information data includes a plurality of character strings, and a plurality of positional control codes indicative of positions of the character strings in the current BIOS screen image;
  wherein the acquiring current screen information includes:
    upon receipt of the screen information data, generating a simulation screen image that corresponds to the current BIOS screen image based on the character strings and the positional control codes; and
    acquiring the current screen information based on the simulation screen image.

7. The method of claim 1, wherein the current screen information is an image file.

8. The method of claim 1, wherein the current screen information is a text file.

9. The method of claim 1, wherein the image classification model is obtained using a support vector machine.

10. The method of claim 1, wherein the screen categories include a category of power-on self-test, a category of BIOS boot specification menu, a category of setup menu, a category of command line, and a category of preboot execution environment.

* * * * *